United States Patent
Belakshe et al.

(10) Patent No.: US 11,286,415 B2
(45) Date of Patent: Mar. 29, 2022

(54) DOWNHOLE FLUID FOR REMOVING SCALES AND METHODS THEREOF

(71) Applicant: Halliburton Energy Services, Inc., Houston, TX (US)

(72) Inventors: Ravikant S. Belakshe, Pune (IN); Monalisa Mallick, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/760,126

(22) PCT Filed: Dec. 21, 2017

(86) PCT No.: PCT/US2017/068007
§ 371 (c)(1),
(2) Date: Apr. 29, 2020

(87) PCT Pub. No.: WO2019/143312
PCT Pub. Date: Jul. 25, 2019

(65) Prior Publication Data
US 2020/0255719 A1     Aug. 13, 2020

(51) Int. Cl.
*C09K 8/524* (2006.01)
*E21B 36/00* (2006.01)
*E21B 37/06* (2006.01)
*C02F 5/12* (2006.01)

(52) U.S. Cl.
CPC ............... *C09K 8/524* (2013.01); *C02F 5/12* (2013.01); *E21B 36/00* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 3,794,523 A | 2/1974 | Thompson | |
| 5,904,208 A | 5/1999 | Ray | |
| 8,541,347 B2 | 9/2013 | Watkins | |
| 2003/0024703 A1* | 2/2003 | McKenzie | C09K 8/524 166/304 |
| 2003/0104950 A1 | 6/2003 | Frenier | |
| 2006/0042796 A1* | 3/2006 | Qu | C09K 8/52 166/279 |

(Continued)

FOREIGN PATENT DOCUMENTS

WO     9210998 A1     7/1992

OTHER PUBLICATIONS

International Search Report and Written Opinion dated Sep. 18, 2019 for PCT Application No. PCT/USPCT/US2017/068007 filed Dec. 21, 2017 (15 pages).

*Primary Examiner* — John J Figueroa
(74) *Attorney, Agent, or Firm* — Chamberlain Hrdlicka (57) ABSTRACT

Compositions and methods for removing scales within a subterranean environment are provided. The method includes placing a treatment fluid into the subterranean environment containing oil-laden scales and dissolving the oil-laden scales by contacting the treatment fluid to the oil-laden scales. The treatment fluid contains a solvent mixture containing a pyrrolidone and a terpene, an emulsifier, and a chelate mixture containing hydrochloric acid and a chelating agent that contains methylglycine diacetate.

20 Claims, 1 Drawing Sheet (56) References Cited

U.S. PATENT DOCUMENTS

| | | | |
|---|---|---|---|
| 2007/0265171 A1* | 11/2007 | Javora | C09K 8/524 |
| | | | 507/90 |
| 2010/0130389 A1 | 5/2010 | Lightford | |
| 2012/0260938 A1 | 10/2012 | Zack | |
| 2014/0116695 A1 | 5/2014 | Maghrabi | |
| 2015/0141302 A1 | 5/2015 | Nasr-el-Din | |
| 2016/0222279 A1* | 8/2016 | Cassidy | E21B 41/02 |
| 2017/0022409 A1* | 1/2017 | Mohs | E21B 21/062 |
| 2017/0218261 A1* | 8/2017 | Nguyen | E21B 33/138 |
| 2017/0233636 A1* | 8/2017 | Bake | C09K 8/54 |
| | | | 507/242 |
| 2017/0240804 A1* | 8/2017 | Tellez | C09K 8/473 |
| 2017/0335175 A1 | 11/2017 | Oliveira | |
| 2018/0148632 A1* | 5/2018 | Bennett | C09K 8/54 |

\* cited by examiner

DOWNHOLE FLUID FOR REMOVING SCALES AND METHODS THEREOF

BACKGROUND

This section is intended to provide relevant background information to facilitate a better understanding of the various aspects of the described embodiments. Accordingly, it should be understood that these statements are to be read in this light and not as admissions of prior art.

Acid-based fluids have been used for scale removal and matrix acidizing in downhole environments. However, at downhole temperatures of 200° F. and greater, controlling the corrosiveness of acid-based fluids is a challenge, even when the fluids contain added corrosion inhibitors. Acid-based fluids can lead to severe corrosion to the metal tubulars, can produce asphaltene sludging within downhole environments that contain organic residue rich formations, and can have other compatibility issues with downhole tools and fluids.

Therefore, there is a need for a downhole acid-based fluid that achieves scale removal and matrix acidification in downhole environments containing organic residue rich formations that minimizes or avoids corrosion to tubulars.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Embodiments provide compositions and methods for removing scales within a subterranean environment. In one or more embodiments, a method includes placing a treatment fluid into the subterranean environment containing oil-laden scales and dissolving the oil-laden scales by contacting the treatment fluid to the oil-laden scales. The oil-laden scales contain organic residue and therefore can be harder to dissolve relative to scales having less or no organic residue. The treatment fluid contains a solvent mixture containing a pyrrolidone and a terpene, an emulsifier, and a chelate mixture containing hydrochloric acid and a chelating agent that contains methylglycine diacetate. The treatment fluid dissolves the oil-laden scales including both the organic residue and the inorganic scale portion.

Figure 1:
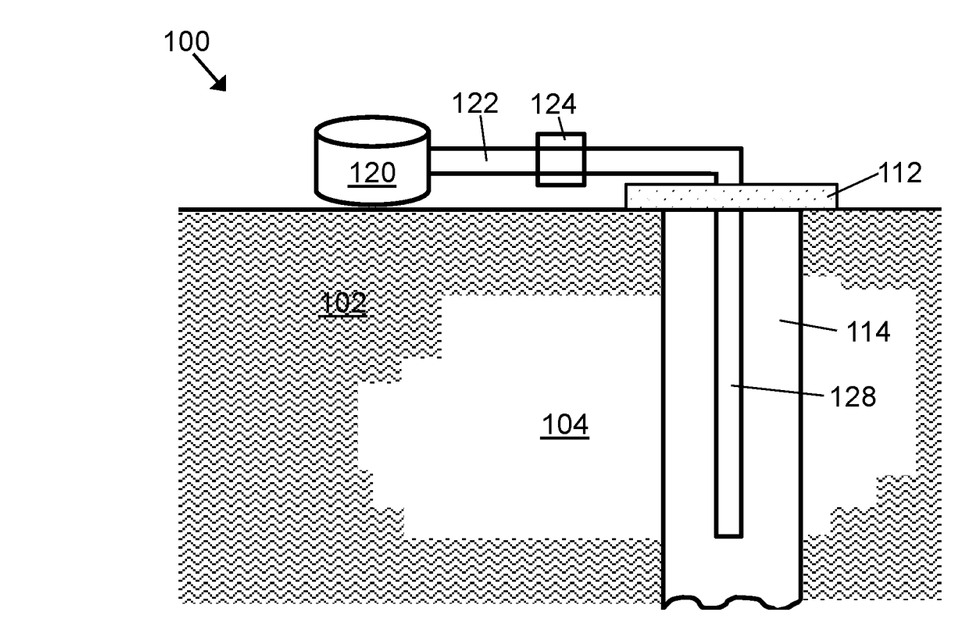
FIG. 1 is a schematic view of a delivery system that can be used to introduce treatment fluids into a subterranean environment, according to one or more embodiments.

FIG. 1 is a schematic view of a delivery system 100 that can be used to deliver or otherwise introduce one or more treatment fluids into a downhole location, such as a subterranean formation 104 or other portion of a subterranean environment, according to one or more embodiments. As depicted in FIG. 1, the delivery system 100 includes a container 120, in which one or more treatment fluids can be made, stirred, mixed, stored, or any combination thereof. For example, the treatment fluid can include one or more solvent mixtures, one or more emulsifiers, and one or more chelate mixtures. In one or more examples the solvent mixture contains one or more pyrrolidones and one or more terpenes and the chelate mixture contains hydrochloric acid and one or more chelating agents, such as methylglycine diacetate.

The solvent mixture, the emulsifier, and the chelate mixture are combined to produce the treatment fluid prior to placing the treatment fluid into the subterranean formation 104. For example, the treatment fluid is produced offsite of the delivery system 100 and subsequently introduced or otherwise added into the container 120. In other examples, one or more components of the treatment fluid are mixed or otherwise combined to produce the treatment fluid onsite of the delivery system 100, such as in the container 120. Thereafter, the treatment fluid is stored until ready to be used. The container 120 can be, but is not limited to, one or more tanks, vessels, columns, or reactors and can include one or more mixing devices and one or more heat control devices.

The treatment fluid is conveyed or otherwise transported from the container 120 via pipe 122 to one or more wellheads 112, where the treatment fluid is introduced into one or more casings or pipes 128. The pipe 128 extends from the wellhead 112 into one or more boreholes or wellbores 114 and the subterranean formation 104 each formed in the terrain 102. Although the wellbore 114 shown in FIG. 1 is a vertical wellbore, the treatment fluid can also be used in wellbore having other orientations. For example, the treatment fluid can be introduced into horizontal wellbores, slant wellbores, curved wellbores, vertical wellbores, or any combination thereof. It should be noted that while FIG. 1 generally depicts a land-based system, it is to be recognized that like systems can be operated in subsea locations as well.

One or more pumps 124 are coupled to and in fluid communication with the pipe 122, as shown in FIG. 1, and/or with the pipe 128. The pump 124 transports the treatment fluid from the container 120, through the pipes 122, 128 and the wellbore 114, and into the subterranean formation 104. The pump 124 can also be used to control the pressure within the subterranean environment, such as the wellbore 114 and the subterranean formation 104. The subterranean environment can be or include, but is not limited to, the subterranean formation 104, one or more wells, boreholes, or wellbores 114, one or more casings, tubulars, or pipes 128, perforations, fractures, or cracks within the subterranean formation, perforations within the casing, tubular, or pipe, and/or any combination thereof.

The treatment fluid is flowed into and contained within the subterranean formation 104. Upon being introduced, ejected, or otherwise exiting from the pipe 128, the treatment fluid subsequently penetrates into the subterranean formation 104 and combines or otherwise mixes with oil-laden scales that contain an organic residue within the subterranean formation 104. Once in contact, the treatment fluid dissolves the oil-laden scales that are in any portion of the subterranean environment, including the wellbore 114 and the subterranean formation 104.

It is to be recognized that the delivery system 100 is merely exemplary in nature and various additional components can be present that have not necessarily been depicted in FIG. 1 in the interest of clarity. Non-limiting additional components that can be present include, but are not limited to, supply hoppers, mixing devices, valves, condensers, adapters, joints, gauges, sensors, pumps, compressors, pressure controllers, pressure sensors, flow rate controllers, flow rate sensors, temperature sensors, or temperature control devices.

Oil-laden scale is in subterranean formations, fractures, wellbores, tubulars, downhole equipment and tools, and many other downhole locations in a subterranean environment. Typically, the oil-laden scales are minerals that include organic compounds entrained therein. For example, the oil-laden scales contain inorganic scale materials and an organic residue. The inorganic scale can be or include oxides, hydroxides, carbonates, sulfides, hydrates, or any combination thereof. The inorganic scale can be or include, but is not limited to magnetite ($Fe_3O_4$), quartz ($SiO_2$), magnesioferrite ($MgFe_2O_4$), dolomite ($CaMg(CO_3)_2$), siderite ($FeCO_3$), pyrite ($FeS_2$), aragonite ($CaCO_3$), an aluminum calcium iron sulfide hydroxide mineral ($Al-Ca-Fe-S(OH)_5$), other minerals, hydrates thereof, or any combination thereof. The organic residue can include, but is not limited to, asphaltene (saturates), paraffin, aromatics, resins, or any combination thereof.

The oil-laden scale contains about 40 wt %, about 50 wt %, or about 60 wt % to about 70 wt %, about 75 wt %, about 80 wt %, about 90 wt %, or about 95 wt % of the inorganic scale materials. The oil-laden scale contains about 5 wt %, about 10 wt %, about 15 wt %, about 20 wt %, or about 25 wt % to about 30 wt %, about 35 wt %, about 40 wt %, about 50 wt %, or about 60 wt % of the organic residue. For example, the oil-laden scale can contain about 40 wt % to about 95 wt %, about 50 wt % to about 85 wt %, or about 60 wt % to about 80 wt % of the inorganic scale materials and about 5 wt % to about 60 wt %, about 15 wt % to about 50 wt %, or about 20 wt % to about 40 wt % of the organic residue.

The oil-laden scales are dissolved and/or consumed by contacting the treatment fluid to the oil-laden scales at a temperature of about 200° F. or greater than 200° F. The temperature can be about 200° F., about 250° F., about 300° F., or about 350° F. to about 400° F., about 450° F., about 500° F., about 550° F., about 600° F., or greater. For example, the temperature can be about 200° F. to about 600° F., about 200° F. to about 500° F., about 200° F. to about 450° F., about 200° F. to about 400° F., about 250° F. to about 400° F., about 250° F. to about 350° F., or about 275° F. to about 325° F. In some examples, the temperature can be greater than 200° F. to about 600° F., greater than 200° F. to about 500° F., greater than 200° F. to about 450° F., greater than 200° F. to about 400° F., greater than 250° F. to about 400° F., greater than 250° F. to about 350° F., or greater than 275° F. to about 325° F.

Treatment Fluid

In one or more embodiments, the treatment fluid for removing scales includes a solvent mixture, one or more emulsifiers, and a chelate mixture.

The treatment fluid can include from about 5 vol %, about 6 vol %, about 7 vol %, about 8 vol %, or about 9 vol % to about 10 vol %, about 11 vol %, about 12 vol %, about 15 vol %, about 17 vol %, or about 20 vol % of the solvent mixture. For example, the treatment fluid can include from about 5 vol % to about 20 vol %, about 5 vol % to about 15 vol %, about 5 vol % to about 10 vol %, about 7 vol % to about 20 vol %, about 7 vol % to about 15 vol %, or about 7 vol % to about 10 vol % of the solvent mixture.

The treatment fluid can include from about 0.1 vol %, about 0.2 vol %, about 0.4 vol %, about 0.5 vol %, or about 0.7 vol % to about 0.8 vol %, about 1 vol %, about 1.2 vol %, about 1.5 vol %, about 1.7 vol %, about 2 vol %, about 2.5 vol %, about 3 vol %, about 4 vol %, or about 5 vol % of the emulsifier. For example, the treatment fluid can include from about 0.1 vol % to about 5 vol %, about 0.1 vol % to about 4 vol %, about 0.1 vol % to about 3 vol %, about 0.1 vol % to about 2 vol %, about 0.1 vol % to about 1 vol %, about 0.1 vol % to about 0.5 vol %, about 0.4 vol % to about 5 vol %, about 0.4 vol % to about 4 vol %, about 0.4 vol % to about 3 vol %, about 0.4 vol % to about 2 vol %, about 0.4 vol % to about 1 vol %, about 0.4 vol % to about 0.8 vol %, about 0.4 vol % to about 0.6 vol %, 1 vol % to about 5 vol %, about 1 vol % to about 4 vol %, about 1 vol % to about 3 vol %, about 1 vol % to about 2 vol %, or about 1 vol % to about 1.5 vol % of the emulsifier.

The treatment fluid can include from about 75 vol %, about 80 vol %, about 82 vol %, about 85 vol %, or about 87 vol % to about 88 vol %, about 90 vol %, about 92 vol %, about 94 vol %, about 95 vol %, about 97 vol %, or about 98 vol % of the chelate mixture. For example, the treatment fluid can include about 75 vol % to about 98 vol %, about 75 vol % to about 95 vol %, about 75 vol % to about 94 vol %, about 75 vol % to about 92 vol %, about 75 vol % to about 90 vol %, about 75 vol % to about 88 vol %, about 75 vol % to about 85 vol %, about 75 vol % to about 80 vol %, about 80 vol % to about 98 vol %, about 80 vol % to about 95 vol %, about 80 vol % to about 94 vol %, about 80 vol % to about 92 vol %, about 80 vol % to about 90 vol %, about 80 vol % to about 88 vol %, about 80 vol % to about 85 vol %, about 80 vol % to about 83 vol %, about 85 vol % to about 98 vol %, about 85 vol % to about 95 vol %, about 85 vol % to about 94 vol %, about 85 vol % to about 92 vol %, about 85 vol % to about 90 vol %, about 85 vol % to about 88 vol %, about 85 vol % to about 87 vol %, about 90 vol % to about 98 vol %, about 90 vol % to about 97 vol %, about 90 vol % to about 96 vol %, about 90 vol % to about 95 vol %, about 90 vol % to about 94 vol %, or about 90 vol % to about 92 vol % of the chelate mixture.

The treatment fluid is a relatively strong acidic solution. The treatment fluid has a pH of less 5, and often less than 4 or less than 3. The treatment fluid can have a pH of about −0.5, about −0.2, about 0, about 0.2, about 0.5, about 0.8, or about 1 to about 1.2, about 1.5, about 1.8, about 2, about 2.2, about 2.5, about 2.8, about 3, about 3.2, about 3.5, about 3.8, about 4, about 4.5, or about 5. For example, the treatment fluid can have a pH of about −0.5 to about 5, about −0.5 to about 4, about −0.5 to about 3, about −0.5 to about 2, about −0.5 to about 1.8, about −0.5 to about 1.5, about −0.5 to about 1.2, about −0.5 to about 1, about −0.5 to about 0.8, about −0.5 to about 0.5, about 0.5 to about 5, about 0.5 to about 4, about 0.5 to about 3, about 0.5 to about 2, about 0.5 to about 1.8, about 0.5 to about 1.5, about 0.5 to about 1.2, about 0.5 to about 1, about 0.5 to about 0.8, about 0.8 to about 5, about 0.8 to about 4, about 0.8 to about 3, about 0.8 to about 2, about 0.8 to about 1.8, about 0.8 to about 1.5, about 0.8 to about 1.2, about 0.8 to about 1, about 1 to about 5, about 1 to about 4, about 1 to about 3, about 1 to about 2, about 1 to about 1.8, about 1 to about 1.5, or about 1 to about 1.2.

In other examples, the treatment fluid can have a pH of about −0.5 to less than 5, about −0.5 to less than 4, about −0.5 to less than 3, about −0.5 to less than 2, about −0.5 to less than 1.8, about −0.5 to less than 1.5, about −0.5 to less than 1.2, about −0.5 to less than 1, about −0.5 to less than 0.8, about −0.5 to less than 0.5, about 0.5 to less than 5, about 0.5 to less than 4, about 0.5 to less than 3, about 0.5 to less than 2, about 0.5 to less than 1.8, about 0.5 to less than 1.5, about 0.5 to less than 1.2, about 0.5 to less than 1, about 0.5 to less than 0.8, about 0.8 to less than 5, about 0.8 to less than 4, about 0.8 to less than 3, about 0.8 to less than 2, about 0.8 to less than 1.8, about 0.8 to less than 1.5, about 0.8 to less than 1.2, about 0.8 to less than 1, about 1 to less than 5, about 1 to less than 4, about 1 to less than 3, about 1 to less than 2, about 1 to less than 1.8, about 1 to less than 1.5, or about 1 to less than 1.2.

Solvent Mixture

The solvent mixture contains petroleum naphtha, one or more pyrrolidones, and one or more terpenes. The solvent mixture can include from about 60 vol %, about 65 vol %, about 70 vol %, or about 75 vol % to about 80 vol %, about 85 vol %, about 90 vol %, or about 95 vol % of the petroleum naphtha. For example, the solvent mixture can include from about 60 vol % to about 95 vol %, about 60 vol % to about 90 vol %, about 60 vol % to about 85 vol %, about 60 vol % to about 80 vol %, about 60 vol % to about 75 vol %, about 60 vol % to about 70 vol %, about 70 vol % to about 95 vol %, about 70 vol % to about 90 vol %, about 70 vol % to about 85 vol %, about 70 vol % to about 80 vol %, about 70 vol % to about 75 vol %, or about 75 vol % to about 80 vol % of the petroleum naphtha.

The solvent mixture can include from about 2 vol %, about 4 vol %, about 6 vol %, or about 8 vol % to about 10 vol %, about 12 vol %, about 15 vol %, about 20 vol %, or about 25 vol % of the pyrrolidone. For example, the solvent mixture can include from about 2 vol % to about 25 vol %, about 4 vol % to about 25 vol %, about 4 vol % to about 20 vol %, about 4 vol % to about 18 vol %, about 4 vol % to about 15 vol %, about 4 vol % to about 12 vol %, about 4 vol % to about 10 vol %, about 4 vol % to about 8 vol %, about 6 vol % to about 25 vol %, about 6 vol % to about 20 vol %, about 6 vol % to about 18 vol %, about 6 vol % to about 15 vol %, about 6 vol % to about 12 vol %, about 6 vol % to about 10 vol %, about 6 vol % to about 8 vol %, about 8 vol % to about 25 vol %, about 8 vol % to about 20 vol %, about 8 vol % to about 18 vol %, about 8 vol % to about 15 vol %, about 8 vol % to about 12 vol %, or about 8 vol % to about 10 vol % of the pyrrolidone.

The solvent mixture can include from about 2 vol %, about 4 vol %, about 6 vol %, or about 8 vol % to about 10 vol %, about 12 vol %, about 15 vol %, about 20 vol %, or about 25 vol % of the terpene. For example, the solvent mixture can include from about 2 vol % to about 25 vol %, about 4 vol % to about 25 vol %, about 4 vol % to about 20 vol %, about 4 vol % to about 18 vol %, about 4 vol % to about 15 vol %, about 4 vol % to about 12 vol %, about 4 vol % to about 10 vol %, about 4 vol % to about 8 vol %, about 6 vol % to about 25 vol %, about 6 vol % to about 20 vol %, about 6 vol % to about 18 vol %, about 6 vol % to about 15 vol %, about 6 vol % to about 12 vol %, about 6 vol % to about 10 vol %, about 6 vol % to about 8 vol %, about 8 vol % to about 25 vol %, about 8 vol % to about 20 vol %, about 8 vol % to about 18 vol %, about 8 vol % to about 15 vol %, about 8 vol % to about 12 vol %, or about 8 vol % to about 10 vol % of the terpene.

The naphtha can be or include naphtha solvent, such as one or more petroleum naphthas. For example, the petroleum naphtha can be a heavy aromatic petroleum naphtha. Naphtha solvent, including petroleum naphtha and heavy aromatic petroleum naphtha, as used herein, is a complex combination of hydrocarbons obtained from distillation of aromatic streams. Naphtha solvent contains aromatic hydrocarbons having carbon numbers predominantly in a range of C9 through C16 and boiling in a range of about 165° C. to about 290° C., per the 2017 definition in the Toxic Substances Control Act (TSCA).

The pyrrolidone can be or include, but is not limited to, one or more of 2-pyrrolidone, N-methyl pyrrolidone, N-ethyl pyrrolidone, N-propyl pyrrolidone, N-butyl pyrrolidone, isomers thereof, or any combination thereof. The treatment fluid can include one or more amines with or without the pyrrolidone included therein. Exemplary amines can be or include, but are not limited to, N-methylmorpholine, N-methylformamide, or a combination thereof.

The terpene can be or include, but is not limited to, one, two, or more monoterpenes, diterpenes, triterpenes, tetraterpenes, pentaterpenes, hemiterpenes, sesquiterpenes, any combination thereof. The terpene can be or include, but is not limited to, one or more of dipentene, β-citronellol, citronellyl acetate, citral dimethyl acetal, citronellal, citronellic acid, citral, 2,6-dimethyloctane, 3,7-dimethyl-1-octanol, dihydrolinalool, geraniol, geranyl acetate, geranyl formate, geranylacetone, geranyl nitrile, geranyl tiglate, linalool, linalyl acetate, linalyl propionate, linalyl butyrate, myrcene, nerol, neryl acetate, menthyl acetate, camphoric acid, cantharidin, carvacrol, carvone, p-cymene, m-cymene, o-cymene, (1S, 3R)-(−)-camphoric acid, ethyl chrysanthemate, N-ethyl-p-menthane-3-carboxamide, hinokitiol, cuminaldehyde, dehydroxylinalool oxide, L-menthyl glyoxylate hydrate, L-menthyl L-lactate, limonene, linalool oxide, α-phellandrene, β-phellandrene, α-terpinene, γ-terpinene, terpinen-4-ol, isopulegol, menthol thymol, menthone, menthol, menthoxyacetyl chloride, menthoxyacetic acid, menthyl chloride, menthyl chloroformate, menthyl p-toluenesulfinate, menthyl chloroformate, 8-mercaptomenthone, menthyl succinate, neomenthol, perillaldehyde, piperitone, pulegone, α-terpineol, terpinyl acetate, terpinolene, terpin monohydrate, terpinen-4-ol, linalool oxide pyranoid, borneol, isoborneol, mixtures of borneol and isoborneol, bornyl acetate, isobornyl acetate, mixtures of bornyl acetate and isobornyl acetate, 3-bromocamphor, 3-bromocamphor-8-sulfonic acid ammonium salt, camphene, mixtures of camphene and tricyclene, camphor, (1R)-camphor oxime, camphorquinone, 10-camphorsulfonic acid, sodium 10-camphorsulfonate, 3-carene, 1,8-cineole, 10-camphorsulfonyl chloride, camphanic acid, camphanic chloride, 10,2-camphorsultam, (2R,8aS)-(+)-(camphorylsulfonyl)oxaziridine, (2S,8aR)-(−)-(camphorylsulfonyl)oxaziridine, 10-camphorsulfonimine, camphorquinone, anti-(1R)-(+)-camphorquinone 3-oxime, 3,9-dibromocamphor, fenchone, geniposide, genipin, (1R,2R,5R)-(+)-2-hydroxy-3-pinanone, (1s,2s,5s)-(−)-2-hydroxy-3-pinanone, isoborneol, isobornyl acetate, isobornyl methacrylate, isobornyl acrylate, (S)-(+)-ketopinic acid, (1S)-(−)-1, mercaptoisoborneol, (1S)-(−)-10-mercaptoborneol, α-pinene, β-pinene, α-pinene oxide, paeoniflorin, (1S,2S,3R,5S)-(+)-2,3-pinanediol, swertiamarin, thujone, (1R)-(−)-thiocamphor, 4,7,7-trimethyl-6-thiabicyclo[3.2.1]octane, verbenone, abscisic acid, artemisinin, artemether, artesunate, bisabolene, α-bisabolol, picrotoxin, mixtures of picrotoxinin and picrotin, β-caryophyllene, α-caryophyllene, cedrol, farnesyl acetate, guaiazulene, germacrone, nerolidol, nootkatone, parthenolide, santonin, farnesol, abietic acid, ethyl abietate, sodium abietate, cryptotanshinone, carnosic acid, dehydroabietylamine, dehydroabietylamine, docetaxel, 10-deacetylbaccatin III, forskolin, gibberellin A3, geranyl-linalool, ginkgolide A, isophytol, kirenol, phytol, paclitaxel, phytantriol, phytyl acetate, pisiferic acid, 13-cis-retinoic acid, rebaudioside A, stevioside, (3aR)-(+)-sclareolide, sclareol, triptolide, tanshinone IIA, betulinol, betulinic acid, celastrol, cucurbitacin B, cycloastragenol, glycyrrhetic acid, glycyrrhizin, glycyrrhizin monoammonium salt hydrate, glycyrrhizin trisodium salt hydrate, glycyrrhizin dipotassium salt hydrate, squalane, limonin, oleanolic acid hydrate, stearyl glycyrrhetinate, ursolic acid, β-carotene, capsanthin (e.g., paprika extract in vegetable oil solution), crocin (e.g., gardenia fruits extract), coenzyme Q10, α-ionone, β-ionone, methylionone, α-isomethylionone, retinoic acid solanesol, α-tocopherol, α-tocopherol acetate, D-α-tocopheryl quinone, D-α-tocopherol succinate, isomers thereof, enantiomers thereof, salts thereof, or any combination thereof.

In one or more examples, the terpene contains dipentene and phellandrene. The terpene can include about 40 vol %, about 45 vol %, about 50 vol %, or about 55 vol % to about 60 vol %, about 65 vol %, about 70 vol %, about 75 vol %, or about 80 vol % of the dipentene. For example, the terpene can include about 40 vol % to about 80 vol %, about 45 vol % to about 75 vol %, about 50 vol % to about 70 vol %, about 55 vol % to about 65 vol %, about 57 vol % to about 64 vol %, or about 58 vol % to about 62 vol %. The terpene can include about 20 vol %, about 25 vol %, about 30 vol %, or about 35 vol % to about 40 vol %, about 45 vol %, about 50 vol %, about 55 vol %, or about 60 vol % of the phellandrene. For example, the terpene can include about 20 vol % to about 60 vol %, about 25 vol % to about 55 vol %, about 30 vol % to about 50 vol %, about 35 vol % to about 45 vol %, about 37 vol % to about 44 vol %, or about 38 vol % to about 42 vol %. In some examples, the terpene can include about 40 vol % to about 80 vol % of the dipentene and about 20 vol % to about 60 vol % of the β-phellandrene.

Emulsifier

The solvent mixture can include one or more emulsifiers to maintain the desired emulsion. In one or more embodiments, the emulsifier can be or include, but is not limited to, one or more ethoxylated sorbitol esters, one or more ethoxylated fatty acids, one or more alkyl aryl sulfonates, or any combination thereof. The emulsifier can include from about 75 vol %, about 80 vol %, or about 85 vol % to about 87 vol %, about 90 vol %, about 92 vol %, about 95 vol %, about 97 vol %, about 98 vol %, or about 99 vol % of ethoxylated sorbitol esters. For example, the emulsifier can include from about 75 vol % to about 99 vol %, about 80 vol % to about 99 vol %, about 85 vol % to about 99 vol %, about 90 vol % to about 99 vol %, about 75 vol % to about 95 vol %, about 80 vol % to about 95 vol %, about 85 vol % to about 95 vol %, about 90 vol % to about 95 vol %, about 75 vol % to about 92 vol %, about 80 vol % to about 92 vol %, about 85 vol % to about 92 vol %, about 90 vol % to about 92 vol %, about 75 vol % to about 90 vol %, about 80 vol % to about 90 vol %, about 85 vol % to about 90 vol %, or about 87 vol % to about 90 vol % of ethoxylated sorbitol esters.

The emulsifier can include from about 0.5 vol %, about 1 vol %, about 2 vol %, about 3 vol %, or about 4 vol % to about 5 vol %, about 6 vol %, about 8 vol %, about 10 vol %, about 12 vol %, or about 15 vol % of ethoxylated fatty acids. For example, the emulsifier can include from about 0.5 vol % to about 15 vol %, about 1 vol % to about 15 vol %, about 1 vol % to about 12 vol %, about 1 vol % to about 10 vol %, about 1 vol % to about 8 vol %, about 1 vol % to about 7 vol %, about 1 vol % to about 5 vol %, about 1 vol % to about 4 vol %, about 1 vol % to about 3 vol %, about 2 vol % to about 15 vol %, about 2 vol % to about 12 vol %, about 2 vol % to about 10 vol %, about 2 vol % to about 8 vol %, about 2 vol % to about 7 vol %, about 2 vol % to about 5 vol %, about 2 vol % to about 4 vol %, about 2 vol % to about 3 vol %, about 3 vol % to about 15 vol %, about 3 vol % to about 12 vol %, about 3 vol % to about 10 vol %, about 3 vol % to about 8 vol %, about 3 vol % to about 7 vol %, about 3 vol % to about 5 vol %, or about 3 vol % to about 4 vol % of ethoxylated fatty acids.

The emulsifier can include from about 0.5 vol %, about 1 vol %, about 2 vol %, about 3 vol %, or about 4 vol % to about 5 vol %, about 6 vol %, about 8 vol %, about 10 vol %, about 12 vol %, or about 15 vol % of alkyl aryl sulfonates. For example, the emulsifier can include from about 0.5 vol % to about 15 vol %, about 1 vol % to about 15 vol %, about 1 vol % to about 12 vol %, about 1 vol % to about 10 vol %, about 1 vol % to about 8 vol %, about 1 vol % to about 7 vol %, about 1 vol % to about 5 vol %, about 1 vol % to about 4 vol %, about 1 vol % to about 3 vol %, about 2 vol % to about 15 vol %, about 2 vol % to about 12 vol %, about 2 vol % to about 10 vol %, about 2 vol % to about 8 vol %, about 2 vol % to about 7 vol %, about 2 vol % to about 5 vol %, about 2 vol % to about 4 vol %, about 2 vol % to about 3 vol %, about 3 vol % to about 15 vol %, about 3 vol % to about 12 vol %, about 3 vol % to about 10 vol %, about 3 vol % to about 8 vol %, about 3 vol % to about 7 vol %, about 3 vol % to about 5 vol %, or about 3 vol % to about 4 vol % of alkyl aryl sulfonates.

In one or more examples, the emulsifier can include about 75 vol % to about 99 vol % of ethoxylated sorbitol esters, about 0.5 vol % to about 15 vol % of ethoxylated fatty acids, and about 0.5 vol % to about 15 vol % of alkyl aryl sulfonates. For example, the emulsifier can include about 90% of ethoxylated sorbitol esters, about 5% of ethoxylated fatty acids, and about 5% of alkyl aryl sulfonates.

In another embodiment, the emulsifier can be or include, but is not limited to, one or more ethoxylated nonylphenols, petroleum naphtha (e.g. heavy aromatic petroleum naphtha), one or more alkylaryls (e.g., ethyl benzene), one or more alky alcohols (e.g., isopropanol), or any combination thereof.

The emulsifier can include from about 40 vol %, about 50 vol %, or about 55 vol % to about 60 vol %, about 65 vol %, about 70 vol %, about 75 vol %, or about 80 vol % of ethoxylated nonylphenols. For example, the emulsifier can include from about 40 vol % to about 80 vol %, about 50 vol % to about 80 vol %, about 60 vol % to about 80 vol %, about 65 vol % to about 80 vol %, about 70 vol % to about 80 vol %, about 40 vol % to about 75 vol %, about 50 vol % to about 75 vol %, about 60 vol % to about 75 vol %, about 65 vol % to about 75 vol %, about 70 vol % to about 75 vol %, about 40 vol % to about 70 vol %, about 50 vol % to about 70 vol %, about 60 vol % to about 70 vol %, or about 65 vol % to about 70 vol % of ethoxylated nonylphenols.

The emulsifier can include from about 10 vol %, about 20 vol %, or about 25 vol % to about 30 vol %, about 40 vol %, or about 50 vol % of petroleum naphtha. For example, the emulsifier can include from about 10 vol % to about 50 vol %, about 10 vol % to about 40 vol %, about 10 vol % to about 30 vol %, about 10 vol % to about 20 vol %, about 20 vol % to about 50 vol %, about 20 vol % to about 40 vol %, about 20 vol % to about 30 vol %, about 20 vol % to about 25 vol %, about 25 vol % to about 50 vol %, about 25 vol % to about 40 vol %, or about 25 vol % to about 30 vol % of petroleum naphtha.

The emulsifier can include from about 0.5 vol %, about 1 vol %, about 2 vol %, about 3 vol %, or about 4 vol % to about 5 vol %, about 6 vol %, about 8 vol %, about 10 vol %, about 12 vol %, or about 15 vol % of alkylaryls (e.g., ethyl benzene). For example, the emulsifier can include from about 0.5 vol % to about 15 vol %, about 1 vol % to about 15 vol %, about 1 vol % to about 12 vol %, about 1 vol % to about 10 vol %, about 1 vol % to about 8 vol %, about 1 vol % to about 7 vol %, about 1 vol % to about 5 vol %, about 1 vol % to about 4 vol %, about 1 vol % to about 3 vol %, about 2 vol % to about 15 vol %, about 2 vol % to about 12 vol %, about 2 vol % to about 10 vol %, about 2 vol % to about 8 vol %, about 2 vol % to about 7 vol %, about 2 vol % to about 5 vol %, about 2 vol % to about 4 vol %, about 2 vol % to about 3 vol %, about 3 vol % to about 15 vol %, about 3 vol % to about 12 vol %, about 3 vol % to about 10 vol %, about 3 vol % to about 8 vol %, about 3 vol % to about 7 vol %, about 3 vol % to about 5 vol %, or about 3 vol % to about 4 vol % of alkylaryls (e.g., ethyl benzene).

The emulsifier can include from about 0.5 vol %, about 1 vol %, about 2 vol %, about 3 vol %, or about 4 vol % to about 5 vol %, about 6 vol %, about 8 vol %, about 10 vol %, about 12 vol %, or about 15 vol % of alky alcohols (e.g., isopropanol). For example, the emulsifier can include from about 0.5 vol % to about 15 vol %, about 1 vol % to about 15 vol %, about 1 vol % to about 12 vol %, about 1 vol % to about 10 vol %, about 1 vol % to about 8 vol %, about 1 vol % to about 7 vol %, about 1 vol % to about 5 vol %, about 1 vol % to about 4 vol %, about 1 vol % to about 3 vol %, about 2 vol % to about 15 vol %, about 2 vol % to about 12 vol %, about 2 vol % to about 10 vol %, about 2 vol % to about 8 vol %, about 2 vol % to about 7 vol %, about 2 vol % to about 5 vol %, about 2 vol % to about 4 vol %, about 2 vol % to about 3 vol %, about 3 vol % to about 15 vol %, about 3 vol % to about 12 vol %, about 3 vol % to about 10 vol %, about 3 vol % to about 8 vol %, about 3 vol % to about 7 vol %, about 3 vol % to about 5 vol %, or about 3 vol % to about 4 vol % of alky alcohols (e.g., isopropanol).

In one or more examples, the emulsifier can include about 40 vol % to about 80 vol % of ethoxylated nonylphenols, about 15 vol % to about 50 vol % of heavy aromatic petroleum naphtha, about 0.5 vol % to about 15 vol % of ethyl benzene, and about 0.5 vol % to about 15 vol % of isopropanol. In other examples, the emulsifier can include about 60% of ethoxylated nonylphenols, about 30% of heavy aromatic petroleum naphtha, about 5% of ethyl benzene, and about 5% of isopropanol.

Chelate Mixture

The chelate mixture contains water, hydrochloric acid, and one or more chelating agents. The chelate mixture can include from about 60 vol %, about 65 vol %, about 70 vol %, or about 75 vol % to about 80 vol %, about 85 vol %, about 90 vol %, or about 95 vol % of water. For example, the chelate mixture can include from about 60 vol % to about 95 vol %, about 60 vol % to about 90 vol %, about 60 vol % to about 85 vol %, about 60 vol % to about 80 vol %, about 60 vol % to about 75 vol %, about 60 vol % to about 70 vol %, about 70 vol % to about 95 vol %, about 70 vol % to about 90 vol %, about 70 vol % to about 85 vol %, about 70 vol % to about 80 vol %, about 70 vol % to about 75 vol %, or about 75 vol % to about 80 vol % of water.

The chelate mixture can include from about 1 vol %, about 1.5 vol %, about 2 vol %, about 2.5 vol %, about 3 vol %, or 3.5 vol % to about 4 vol %, about 4.5 vol %, about 5 vol %, about 6 vol %, about 8 vol %, about 10 vol %, about 12 vol %, about 15 vol %, or about 20 vol % of hydrogen chloride, as hydrochloric acid. For example, the chelate mixture can include from about 1 vol % to about 20 vol %, about 1 vol % to about 15 vol %, about 1 vol % to about 12 vol %, about 1 vol % to about 10 vol %, about 1 vol % to about 8 vol %, about 1 vol % to about 6 vol %, about 1 vol % to about 4 vol %, about 2 vol % to about 20 vol %, about 2 vol % to about 15 vol %, about 2 vol % to about 12 vol %, about 2 vol % to about 10 vol %, about 2 vol % to about 8 vol %, about 2 vol % to about 6 vol %, about 2 vol % to about 4 vol %, about 4 vol % to about 20 vol %, about 4 vol % to about 15 vol %, about 4 vol % to about 12 vol %, about 4 vol % to about 10 vol %, about 4 vol % to about 8 vol %, about 4 vol % to about 6 vol %, about 4 vol % to about 5 vol %, or about 3 vol % to about 5 vol % of hydrogen chloride, as hydrochloric acid.

The chelate mixture can include from about 2 vol %, about 4 vol %, about 6 vol %, or about 8 vol % to about 10 vol %, about 12 vol %, about 15 vol %, about 20 vol %, or about 25 vol % of the chelating agent. For example, the chelate mixture can include from about 2 vol % to about 25 vol %, about 4 vol % to about 25 vol %, about 4 vol % to about 20 vol %, about 4 vol % to about 18 vol %, about 4 vol % to about 15 vol %, about 4 vol % to about 12 vol %, about 4 vol % to about 10 vol %, about 4 vol % to about 8 vol %, about 6 vol % to about 25 vol %, about 6 vol % to about 20 vol %, about 6 vol % to about 18 vol %, about 6 vol % to about 15 vol %, about 6 vol % to about 12 vol %, about 6 vol % to about 10 vol %, about 6 vol % to about 8 vol %, about 8 vol % to about 25 vol %, about 8 vol % to about 20 vol %, about 8 vol % to about 18 vol %, about 8 vol % to about 15 vol %, about 8 vol % to about 12 vol %, or about 8 vol % to about 10 vol % of the chelating agent.

In one or more examples, the chelate mixture contains methylglycine diacetate and optionally one or more other chelating agents. The methylglycine diacetate can be or include trisodium methylglycine diacetate. In some embodiments, the chelating agent can be or include, but is not limited to, one or more of methylglycine diacetic acid, glutamic acid diacetic acid, glutamate diacetate, β-alanine diacetic acid, β-alanine diacetate, S,S-ethylenediamine disuccinic acid, S,S-ethylenediamine disuccinate, iminodisuccinic acid, iminodisuccinate, hydroxyiminodisuccinic acid, hydroxyiminodisuccinate, salts thereof, hydrates thereof, complexes thereof, or any combination thereof.

Apart from or along with a solution of methylglycine diacetate (e.g., trisodium salt of methylglycine diacetic acid), the chelate mixture can also include one or more additional chelating agents. Exemplary chelating agents can be or include, but are not limited to, phosphate-based chelating agents; phosphonate-based chelating agents; ethylenediaminetetraacetic acid (EDTA); propylenediaminetetraacetic acid (PDTA); nitrilotriacetic acid (NTA); N-(2-Hydroxyethyl)ethylenediamine-N,N',N'-triacetic acid trisodium salt (HEDTA); diethylenetriaminepentaacetic acid (DTPA); hydroxyethyliminodiacetic acid (HEIDA); cyclohexylenediaminetetraacetic acid (CDTA); diphenylamine-sulfonic acid (DPAS); ethylenediaminedi(o-hydroxyphenylacetic) acid (EDDHA); glucoheptonic acid; gluconic acid; citric acid; glutamic acid diacetic acid (GLDA); β-alanine diacetic acid (β-ADA); ethylenediaminedisuccinic acid; S,S-ethylenediaminedisuccinic acid (EDDS); iminodisuccinic acid (IDS); hydroxyiminodisuccinic acid (HIDS); polyamino disuccinic acids; N-bis[2-(1,2-dicarboxyethoxy)ethyl]glycine (BCA6); N-bis[2-(1,2-dicarboxyethoxy)ethyl] aspartic acid (BCA5); N-bis[2-(1,2-dicarboxyethoxy)ethyl] methylglycine (MCBA5); N-tris[(1,2-dicarboxyethoxy)ethyl]amine (TCA6); N-methyliminodiacetic acid (MIDA); iminodiacetic acid (IDA); N-(2-acetamido)iminodiacetic acid (ADA); hydroxymethyl-iminodiacetic acid; 2-(2-carboxyethylamino) succinic acid (CEAA); 2-(2-carboxymethylamino) succinic acid (CMAA); diethylenetriamine-N,N"-disuccinic acid; triethylenetetramine-N,N'"-disuccinic acid; 1,6-hexamethylenediamine-N,N'-disuccinic acid; tetraethylenepentamine-N,N""-disuccinic acid; 2-hydroxypropylene-1,3-diamine-N,N'-disuccinic acid; 1,2-propylenediamine-N,N'-disuccinic acid; 1,3-propylenediamine-N,N'-disuccinic acid; cis-cyclohexanediamine-N,N'-disuccinic acid; trans-cyclohexanediamine-N,N'-disuccinic acid; ethylenebis(oxyethylenenitrilo)-N,N'-disuccinic acid; glucoheptanoic acid; cysteic acid-N,N-diacetic acid; cysteic acid-N-monoacetic acid; alanine-N-monoacetic acid; N-(3-hydroxysuccinyl) aspartic acid; N-[2-(3-hydroxysuccinyl)]-L-serine; aspartic acid-N,N-diacetic acid; aspartic acid-N-monoacetic acid; any salt thereof; any derivative thereof; and any combination thereof.

In one or more examples, a treatment fluid for removing scales contains a solvent mixture, an emulsifier, and a chelate mixture. The solvent mixture includes about 2 vol % to about 25 vol % of the N-methyl pyrrolidone, about 2 vol % to about 25 vol % of the terpene, and about 50 vol % to about 90 vol % of the petroleum naphtha. The emulsifier can include ethoxylated sorbitol ester and at least one of ethoxylated fatty acid, alkyl aryl sulfonate, or a combination thereof. Alternatively, the emulsifier can include ethoxylated nonylphenol, heavy aromatic petroleum naphtha, and at least one of ethyl benzene, isopropanol, or a combination thereof. The chelate mixture contains hydrochloric acid, a methylglycine diacetate, and optionally one or more other chelating agents.

EXPERIMENTAL SECTION

Example 1: Chelate Blend

About 576.1 mL of water, about 115.4 mL of about 35 vol % hydrochloric acid (remainder water), and about 308.5 mL of about 40 vol % of aqueous solution of trisodium salt of methylglycine diacetic acid (remainder water) were added into a vessel. The components were maintained at ambient temperature of about 23° C. and mixed for about 5 minutes to produce the chelate blend. The chelate blend had a pH value of about 1.

Example 2: Treatment Fluid

About 76 mL of heavy aromatic petroleum naphtha, about 10 mL of N-methyl pyrrolidone (NMP), about 10 mL of terpene blend (about 60 vol % of dipentene and about 40 vol % of β-phellandrene) were combined and mixed in a blender for 2 minutes. About 4 mL of emulsifier-1 (about 90 vol % of ethoxylated sorbitol ester, about 5 vol % of ethoxylated fatty acid, and about 5 vol % of alkyl aryl sulfonate) was added to the mixture in the blender and mixed for about 2 minutes. About 900 mL of chelate blend (Ex. 1) was added to the mixture in the blender. The components were maintained at ambient temperature of about 23° C. and mixed for about 5 minutes to produce the treatment fluid. The treatment fluid had a pH value of about 1.

Example 3: Chelate Blend

About 587 mL of water, about 104.5 mL of about 35 vol % hydrochloric acid (remainder water), and about 308.5 mL of about 40 vol % of aqueous solution of trisodium salt of methylglycine diacetic acid (remainder water) were added into a vessel. The components were maintained at ambient temperature of about 23° C. and mixed for about 5 minutes to produce the chelate blend. The chelate blend had a pH value of about 2.

Example 4: Treatment Fluid

About 900 mL of chelate blend (Ex. 3), about 90 mL of heavy aromatic petroleum naphtha and about 10 mL of emulsifier-1 (about 90 vol % of ethoxylated sorbitol ester, about 5 vol % of ethoxylated fatty acid, and about 5 vol % of alkyl aryl sulfonate) were added into a blender. The components were maintained at ambient temperature of about 23° C. and mixed for about 5 minutes to produce the treatment fluid. The treatment fluid had a pH value of about 2.

Example 5: Treatment Fluid

About 900 mL of chelate blend (Ex. 3), about 90 mL of heavy aromatic petroleum naphtha and about 10 mL of emulsifier-2 (about 60 vol % of ethoxylated nonylphenol, about 30 vol % of heavy aromatic naptha, about 5 vol % of ethyl benzene, and about 5 vol % of isopropanol) were added into a blender. The components were maintained at ambient temperature of about 23° C. and mixed for about 5 minutes to produce the treatment fluid. The treatment fluid had a pH value of about 2.

Examples 6a-6d: Solubility Testing

Treatment fluids prepared according to Examples 2-5 were evaluated for their ability to dissolve oil-laden scales retrieved from an oil well.

A sample of the oil-laden scales was weighed and cleaned several times using solvents including acetone, chloroform, and xylene to remove the organic phase from the inorganic phase. The remaining inorganic phase was insoluble in solvent and water and was solid in nature. The weight difference after cleaning the oil-laden scales with solvents was measured, the amount dissolved in solvent was considered as the organic phase whereas insoluble part was inorganic phase. The oil-laden scales were found to contain about 76 wt % of an inorganic phase and about 24 wt % of an organic phase.

The inorganic phase was further analyzed with X-ray diffraction (XRD) spectroscopy for phase determination. The composition of the inorganic phase was about 84 wt % of magnetite ($Fe_3O_4$), about 1 wt % of quartz ($SiO_2$), about 3 wt % of magnesioferrite ($MgFe_2O_4$), about 1 wt % of dolomite ($CaMg(CO_3)_2$), about 3 wt % of siderite ($FeCO_3$), about 2 wt % of pyrite ($FeS_2$), about 1 wt % of aragonite ($CaCO_3$), and about 6 wt % of an aluminum calcium iron sulfide hydroxide mineral (Al—Ca—Fe—$S(OH)_5$). For the aluminum calcium iron sulfide hydroxide mineral, an unmatched peak was observed at $2\theta=16.46$ in XRD analysis, for which no perfect match was observed from crystallographic library data. However, a phase for Al—Ca—Fe—$S(OH)_5$ is consistent based on the XRD study. The organic residue of the organic phase contained asphaltene, paraffin, and other organic compounds.

Example 6a was a blank and contained about 100 mL of the chelate blend from Example 3. Example 6b contained about 100 mL of the treatment fluid from Example 2. Example 6c contained about 100 mL of the treatment fluid from Example 4. Example 6d contained about 100 mL of the treatment fluid from Example 5. Glass liners were prepared for each of the Examples 6a-6d and contained about 2 g of oil-laden scales. Each glass liner having oil-laden scale sample was charged with the respective treatment fluids. The glass liners were lowered down into FANN® aging cells, commercially available from Fann Instrument Company. Each aging cell was pressurized with about 500 psi nitrogen pressure. These pressurized aging cells were placed in pre-heated oven at about 300° F. for about 12 hours duration. After completion of 12 hours, the aging cells were cooled to ambient temperature of about 23° C. and depressurized to atmospheric pressure. The content from each test mixture from Examples 6a-6d was filtered through Whatmann filter paper 42. The filter paper was dried and percent scale solubility was determined gravimetrically. The amount of scale content spent in the filtrate was then measured using inductively coupled plasma mass spectrometry analysis. The determined weight percent of solubility is listed in Table 1.

TABLE 1

| Examples | 6a | 6b | 6c | 6d |
|---|---|---|---|---|
| Treatment Fluids | Ex. 3 | Ex. 2 | Ex. 4 | Ex. 5 |
| Solubility (wt %) | 48.7 | 86.0 | 59.0 | 61.6 |

The solubility of the oil-laden scale was greatest for Example 6b at 86.0 wt %. Examples 6c and 6d had significantly lower solubility values of the oil-laden scale at 59.0 wt % and 61.6 wt %, respectively. Example 6d had the lowest solubility of the oil-laden scale at 48.7 wt %.

Examples 7a-7c: Corrosion Testing

For Examples 7a-7c, these tests evaluate the efficiency of an effect of treatment fluids on oil field metal assets and also used to study effective combination of corrosion inhibitor and corrosion inhibitor intensifier for protection of metal assets. Test specimen may include representative coupons cut from oil field metallurgies e.g., casing, coiled tubing or downhole tools.

Example 7a contains about 100 mL of an acid mixture containing about 90 mL of xylene, about 10 mL of emulsifier-1 (about 90 vol % of ethoxylated sorbitol ester, about 5 vol % of ethoxylated fatty acid, and about 5 vol % of alkyl aryl sulfonate), about 503 mL of water, about 6 g of citric acid, about 10 mL of acetic acid, and about 387 mL of 35 vol % hydrochloric acid (remainder water) and has a pH of about 1. Example 7b contains about 100 mL of the treatment fluid from Example 2. Example 7c contains about 99.2 mL of the treatment fluid from Example 2 and about 0.8 mL of a thioglycolic acid based corrosion inhibitor, commercially available as MSA-III corrosion inhibitor.

Weight loss corrosion testing was performed in individual Hastelloy B-2 autoclaves. The test samples are made of high strength low alloy steel (HSLAS) coupons, such as QT-1000 coupons which have a chemical composition that meets the specification requirements of API 5ST CT-100. About 100 mL of the test blend was placed into a glass cell, followed by introduction of the test specimen. Coupons were prepared by degreasing with acetone and bead blasting. After capping the cell, the autoclave was filled with EPF S 20 oil as heat transfer medium and pressurized to a test pressure of about 1,000 psi with nitrogen. Heating was accomplished using EUROTHERM® controllers which adjust a specific heating ramp up to the test temperature via a computer control. Pressure was maintained using a back pressure regulator assembly which allows for automatic bleed-off of excess pressure developed during heating and corrosion. The total test time include about 75 minutes of heat up and about 15 mins of cool down time. Surface area of each coupon was: about 4.44 inch$^2$ and corrosion loss criteria for passing was corrosion loss ≤0.05 lb/ft$^2$. The determined corrosion losses are listed in Table 2.

TABLE 2

| Examples | Corrosion Loss (lb/ft$^2$) |
|---|---|
| 7a | 1.06 |
| 7b | 0.18 |
| 7c | 0.04 |

PAD acid solution can be used to dissolve scales, but generally the strong acidity, typically with a pH of about 1, causes a great deal of corrosion loss to metallic surfaces. As shown by the nickel alloy coupons in Table 2, the PAD solution (Ex. 7a) caused a corrosion loss of about 1.06 lb/ft$^2$, the treatment solution without a corrosion inhibitor (Ex. 7b) caused a corrosion loss of only about 0.18 lb/ft$^2$, and the treatment solution with a corrosion inhibitor (Ex. 7c) caused a corrosion loss of only about 0.04 lb/ft$^2$.

In addition to the embodiments described above, embodiments of the present disclosure further relate to one or more of the following paragraphs:

1. A method for removing scales within a subterranean environment, comprising placing a treatment fluid into the subterranean environment containing oil-laden scales comprising an organic residue, wherein the treatment fluid comprises a solvent mixture comprising a pyrrolidone and a terpene, an emulsifier, and a chelate mixture comprising hydrochloric acid and a chelating agent, wherein the chelating agent comprises methylglycine diacetate, and dissolving the oil-laden scales by contacting the treatment fluid to the oil-laden scales.

2. The method of paragraph 1, wherein the solvent mixture, the emulsifier, and the chelate mixture are combined to produce the treatment fluid prior to placing the treatment fluid into the subterranean environment.

3. The method of paragraph 1 or 2, wherein the treatment fluid further comprises a pH of about 0.5 to about 2.

4. The method of any one of paragraphs 1-3, wherein the treatment fluid further comprises a pH of about 0.8 to about 1.5.

5. The method of any one of paragraphs 1-4, wherein the organic residue comprises asphaltene, paraffin, or combinations thereof.

6. The method of any one of paragraphs 1-5, wherein the oil-laden scales are dissolved by contacting the treatment fluid to the oil-laden scales at a temperature of greater than 200° F. to about 500° F.

7. The method of any one of paragraphs 1-6, wherein the oil-laden scales are dissolved by contacting the treatment fluid to the oil-laden scales at a temperature of about 250° F. to about 400° F.

8. The method of any one of paragraphs 1-7, wherein the oil-laden scales are dissolved by contacting the treatment fluid to the oil-laden scales at a temperature of about 250° F. to about 350° F.

9. The method of any one of paragraphs 1-8, wherein the oil-laden scales are dissolved by contacting the treatment fluid to the oil-laden scales at a temperature of about 275° F. to about 325° F.

10. The method of any one of paragraphs 1-9, wherein the pyrrolidone comprises 2-pyrrolidone, N-methyl pyrrolidone, N-ethyl pyrrolidone, N-propyl pyrrolidone, N-butyl pyrrolidone, isomers thereof, or any combination thereof.

11. The method of any one of paragraphs 1-10, wherein the solvent mixture comprises N-methylmorpholine, N-methylformamide, or a combination thereof.

12. The method of any one of paragraphs 1-11, wherein the terpene comprises dipentene and phellandrene.

13. The method of paragraph 12, wherein the terpene comprises about 40 vol % to about 80 vol % of the dipentene and about 20 vol % to about 60 vol % of the β-phellandrene.

14. The method of any one of paragraphs 1-13, wherein the solvent mixture further comprises petroleum naphtha.

15. The method of paragraph 14, wherein the solvent mixture comprises about 2 vol % to about 25 vol % of the N-methyl pyrrolidone, about 2 vol % to about 25 vol % of the terpene, and about 50 vol % to about 90 vol % of the petroleum naphtha.

16. The method of paragraph 14, wherein the petroleum naphtha comprises heavy aromatic petroleum naphtha.

17. The method of any one of paragraphs 1-16, wherein the emulsifier comprises ethoxylated sorbitol ester and at least one of ethoxylated fatty acid, alkyl aryl sulfonate, or a combination thereof.

18. The method of any one of paragraphs 1-17, wherein the emulsifier comprises ethoxylated nonylphenol, heavy aromatic petroleum naphtha, and at least one of ethyl benzene, isopropanol, or a combination thereof.

19. The method of any one of paragraphs 1-18, wherein the chelating agent further comprises at least one methylglycine diacetic acid, glutamic acid diacetic acid, glutamate diacetate, β-alanine diacetic acid, β-alanine diacetate, S,S-ethylenediamine disuccinic acid, S,S-ethylenediamine disuccinate, iminosuccinic acid, iminodisuccinate, hydroxyiminodisuccinic acid, hydroxyiminodisuccinate, salts thereof, hydrates thereof, complexes thereof, or any combination thereof.

20. The method of any one of paragraphs 1-19, wherein the subterranean environment comprises at least one of a subterranean formation, a well, a borehole, a wellbore, a casing, a tubular, a pipe, a perforation, fracture, or crack within the subterranean formation, a perforation within the casing, tubular, or pipe, and/or any combination thereof.

21. A treatment fluid for removing scales within a subterranean environment, comprising a solvent mixture comprising N-methyl pyrrolidone and a terpene, an emulsifier, hydrochloric acid, and a chelating agent comprising methylglycine diacetate.

22. The treatment fluid of paragraphs 21, further comprising a pH of about 0.5 to about 2.

23. The treatment fluid of paragraph 21 or 22, further comprising a pH of about 0.8 to about 1.5.

24. The treatment fluid of any one of paragraphs 21-23, wherein the solvent mixture further comprises petroleum naphtha.

25. The treatment fluid of paragraph 24, wherein the solvent mixture comprises about 2 vol % to about 25 vol % of the N-methyl pyrrolidone about 2 vol % to about 25 vol % of the terpene, and about 50 vol % to about 90 vol % of the petroleum naphtha.

26. The treatment fluid of paragraph 24, wherein the petroleum naphtha comprises heavy aromatic petroleum naphtha.

27. The treatment fluid of any one of paragraphs 21-26, wherein the terpene comprises dipentene and phellandrene.

28. The treatment fluid of paragraph 27, wherein the terpene comprises about 40 vol % to about 80 vol % of the dipentene and about 20 vol % to about 60 vol % of the β-phellandrene.

29. The treatment fluid of any one of paragraphs 21-28, wherein the emulsifier comprises ethoxylated sorbitol ester and at least one of ethoxylated fatty acid, alkyl aryl sulfonate, or a combination thereof.

30. The treatment fluid of paragraph 29, wherein the emulsifier comprises about 75 vol % to about 99 vol % of the ethoxylated sorbitol ester, about 0.5 vol % to about 15 vol % of the ethoxylated fatty acid, and about 0.5 vol % to about 15 vol % of the alkyl aryl sulfonate.

31. The treatment fluid of any one of paragraphs 21-30, wherein the emulsifier comprises about 90% of the ethoxylated sorbitol ester, about 5% of the ethoxylated fatty acid, and about 5% of the alkyl aryl sulfonate.

32. The treatment fluid of any one of paragraphs 21-31, wherein the emulsifier comprises ethoxylated nonylphenol, heavy aromatic petroleum naphtha, and at least one of ethyl benzene, isopropanol, or a combination thereof.

33. The treatment fluid of paragraph 32, wherein the emulsifier comprises about 40 vol % to about 80 vol % of the ethoxylated nonylphenol, about 15 vol % to about 50 vol % of the heavy aromatic petroleum naphtha, about 0.5 vol % to about 15 vol % of the ethyl benzene, and about 0.5 vol % to about 15 vol % of the isopropanol.

34. The treatment fluid of paragraph 32, wherein the emulsifier comprises about 60% of the ethoxylated nonylphenol, about 30% of the heavy aromatic petroleum naphtha, about 5% of the ethyl benzene, and about 5% of the isopropanol.

35. The treatment fluid of any one of paragraphs 21-34, wherein the methylglycine diacetate comprises trisodium methylglycine diacetate.

36. The treatment fluid of any one of paragraphs 21-35, wherein the chelating agent further comprises at least one methylglycine diacetic acid, glutamic acid diacetic acid, glutamate diacetate, β-alanine diacetic acid, β-alanine diacetate, S,S-ethylenediamine disuccinic acid, S,S-ethylenediamine disuccinate, iminosuccinic acid, iminodisuccinate, hydroxyiminodisuccinic acid, hydroxyiminodisuccinate, salts thereof, hydrates thereof, complexes thereof, or any combination thereof.

37. A treatment fluid for removing scales within a subterranean environment, comprising a solvent mixture comprising about 2 vol % to about 25 vol % of the N-methyl pyrrolidone, about 2 vol % to about 25 vol % of the terpene, and about 50 vol % to about 90 vol % of the petroleum naphtha, an emulsifier comprising ethoxylated sorbitol ester and at least one of ethoxylated fatty acid, alkyl aryl sulfonate, or a combination thereof or ethoxylated nonylphenol, heavy aromatic petroleum naphtha, and at least one of ethyl benzene, isopropanol, or a combination thereof, and a chelate mixture comprising hydrochloric acid and a methylglycine diacetate.

38. A system for performing the method of any one of paragraphs 1-19, comprising a pump configured to place the treatment fluid of any one of paragraphs 1-37 into a subterranean environment.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A treatment fluid for removing scales within a subterranean environment, comprising:
   a solvent mixture comprising N-methyl pyrrolidone and a terpene;
   an emulsifier;
   hydrochloric acid; and
   a chelating agent comprising methylglycine diacetate;
   wherein the treatment fluid is suitable to limit corrosion loss to metallic surfaces to less than about 0.20 lb/ft$^2$ without inclusion of a corrosion inhibitor.

2. The treatment fluid of claim 1, further comprising a pH of about 0.5 to about 2.

3. The treatment fluid of claim 1, wherein the solvent mixture further comprises petroleum naphtha.

4. The treatment fluid of claim 3, wherein the solvent mixture comprises:
   about 2 vol % to about 25 vol % of the N-methyl pyrrolidone;
   about 2 vol % to about 25 vol % of the terpene; and
   about 50 vol % to about 90 vol % of the petroleum naphtha.

5. The treatment fluid of claim 1, wherein the terpene comprises dipentene and phellandrene.

6. The treatment fluid of claim 5, wherein the terpene comprises:
   about 40 vol % to about 80 vol % of the dipentene; and
   about 20 vol % to about 60 vol % of the phellandrene.

7. The treatment fluid of claim 1, wherein the emulsifier comprises ethoxylated sorbitol ester and at least one of ethoxylated fatty acid, alkyl aryl sulfonate, or a combination thereof.

8. The treatment fluid of claim 7, wherein the emulsifier comprises:
   about 75 vol % to about 99 vol % of the ethoxylated sorbitol ester;
   about 0.5 vol % to about 15 vol % of the ethoxylated fatty acid; and
   about 0.5 vol % to about 15 vol % of the alkyl aryl sulfonate.

9. The treatment fluid of claim 1, wherein the emulsifier comprises ethoxylated nonylphenol, heavy aromatic petroleum naphtha, and at least one of ethyl benzene, isopropanol, or a combination thereof.

10. The treatment fluid of claim 9, wherein the emulsifier comprises:
    about 40 vol % to about 80 vol % of the ethoxylated nonylphenol;
    about 15 vol % to about 50 vol % of the heavy aromatic petroleum naphtha;
    about 0.5 vol % to about 15 vol % of the ethyl benzene; and
    about 0.5 vol % to about 15 vol % of the isopropanol.

11. The treatment fluid of claim 1, wherein the chelating agent further comprises at least one of methylglycine diacetic acid, glutamic acid diacetic acid, glutamate diacetate, β-alanine diacetic acid, β-alanine diacetate, S,S-ethylenediamine disuccinic acid, S,S-ethylenediamine disuccinate, iminodisuccinic acid, iminodisuccinate, hydroxyiminodisuccinic acid, hydroxyiminodisuccinate, salts thereof, hydrates thereof, complexes thereof, or any combination thereof.

12. The treatment fluid of claim 1, wherein the solvent mixture further comprises an amine.

13. The treatment fluid of claim 12, wherein the amine comprises N-methylmorpholine, N-methylformamide, or a combination thereof.

14. The treatment fluid of claim 1, wherein the terpene comprises a monoterpene, a diterpene, a triterpene, a tetraterpene, a pentaterpene, a hemiterpene, a sesquiterpene, or any combination thereof.

15. The treatment fluid of claim 1, wherein the subterranean environment comprises a downhole temperature of about 250° F. to about 350° F.

16. The treatment fluid of claim 1, further comprising a thioglycolic acid-based corrosion inhibitor to limit corrosion loss to metallic surfaces to less than about 0.05 lb/ft$^2$.

17. A treatment fluid for removing scales within a subterranean environment, comprising:

a solvent mixture comprising:
- about 2 vol % to about 25 vol % of N-methyl pyrrolidone;
- about 2 vol % to about 25 vol % of terpene; and
- about 50 vol % to about 90 vol % of petroleum naphtha;

an emulsifier comprising:
- ethoxylated sorbitol ester and at least one of ethoxylated fatty acid, alkyl aryl sulfonate, or a combination thereof; or
- ethoxylated nonylphenol, heavy aromatic petroleum naphtha, and at least one of ethyl benzene, isopropanol, or a combination thereof; and a chelate mixture comprising hydrochloric acid and a methylglycine diacetate.

18. A treatment fluid for removing scales comprising an organic residue within a subterranean environment, comprising:
- a solvent mixture comprising a pyrrolidone and a terpene;
- an emulsifier; and
- a chelate mixture comprising hydrochloric acid and a chelating agent, wherein the chelating agent comprises methylglycine diacetate.

19. The treatment fluid of claim 18, wherein the organic residue comprises asphaltene, paraffin, or combinations thereof.

20. The treatment fluid of claim 18, wherein the pyrrolidone comprises 2-pyrrolidone, N-methyl pyrrolidone, N-ethyl pyrrolidone, N-propyl pyrrolidone, N-butyl pyrrolidone, isomers thereof, or any combination thereof.

\* \* \* \* \*